(12) United States Patent
Huang

(10) Patent No.: US 9,680,322 B2
(45) Date of Patent: Jun. 13, 2017

(54) COMPULSORY CHARGING AND PROTECTIVE CIRCUIT FOR SECONDARY BATTERY AFTER BEING OVER DISCHARGED

(71) Applicant: Go-Tech Energy Co., Ltd., New Taipei (TW)

(72) Inventor: Pao-Sheng Huang, MiaoLi County (TW)

(73) Assignee: Go-Tech Energy Co. Ltd., New Taipei (TW)

( * ) Notice: Subject to any disclaimer, the term of this patent is extended or adjusted under 35 U.S.C. 154(b) by 142 days.

(21) Appl. No.: 14/722,860

(22) Filed: May 27, 2015

(65) Prior Publication Data

US 2016/0352126 A1   Dec. 1, 2016

(51) Int. Cl.
*H01M 10/46* (2006.01)
*H02J 7/00* (2006.01)

(52) U.S. Cl.
CPC .......... *H02J 7/0068* (2013.01); *H02J 7/0031* (2013.01); *H02J 2007/004* (2013.01); *H02J 2007/0037* (2013.01)

(58) Field of Classification Search
CPC ................ H02J 7/0034; H02J 7/0036; H02J 2007/0037; H02J 2007/004; H02J 7/0029
USPC ................ 320/107, 127, 134, 135, 136, 137
See application file for complete search history.

(56) References Cited

U.S. PATENT DOCUMENTS

| | | | | |
|---|---|---|---|---|
| 5,530,336 A | * | 6/1996 | Eguchi ................ | H02J 7/0013 320/118 |
| 2014/0232193 A1 | * | 8/2014 | Dien ...................... | H02M 1/34 307/46 |

* cited by examiner

*Primary Examiner* — Edward Tso
(74) *Attorney, Agent, or Firm* — Che-Yang Chen; Law offices of Scott Warmuth

(57) ABSTRACT

A compulsory charging and protective circuit for secondary battery after being over discharged is disclosed. The circuit includes a circuit conducting switch, a releasing unit, a triggering unit and a comparing unit. When the secondary battery is over discharged, a temporary electrical connection is provided by the present invention. The loop of the secondary battery and a charger keeps. When the secondary battery recovers from abnormal status, the temporary electrical connection is called off so that the secondary battery can keep normal operation. Thus, when the secondary battery is under over-discharge, it doesn't have to be unloaded for repair to settle the issue. Maintenance costs can be saved.

10 Claims, 6 Drawing Sheets

COMPULSORY CHARGING AND PROTECTIVE CIRCUIT FOR SECONDARY BATTERY AFTER BEING OVER DISCHARGED

FIELD OF THE INVENTION

The present invention relates to a compulsory charging and protective circuit. More particularly, the present invention relates to a compulsory charging and protective for secondary batteries after being over discharged.

BACKGROUND OF THE INVENTION

Secondary batteries are so-called rechargeable batteries, widely used in many products, such as notebooks, tablets, mobile phones, and even large electric vehicles and robots. Although a rechargeable battery is composed of a number of rechargeable battery cells linked in series or parallel, according to different power supply targets, there are different specifications of output current and voltage.

Since each cell has its unique characteristics when the secondary battery is assembled, it leads to an unbalance problem for the cells of the secondary battery in use no matter it is charging or discharging. Abnormal operations will cause the temperature of the secondary battery to be high, reduce life time of the battery, and even make the battery explode. Reduced life time of the secondary battery mainly suffer from overcharging or over-discharging operations. Therefore, general secondary batteries will have a battery management chip to settle the problems above.

Please see FIG. 1. A structure of a conventional secondary battery 1 is shown. There is a battery management chip 2. A source for storing and providing power for the secondary battery 1 are several cells 3 linked to each other in series. The battery management chip 2 is linked to the group of the cells 3 and can detect the status of each cell 3 effectively. Dynamic balance of the cells 3 is available. In addition, the battery management chip 2, the charging control switch 4 and the discharging control switch 5 from a protective circuit for charging and discharging. The charging control switch 4 and the discharging control switch 5 are composed of a field effect transistor and a parasitic diode. The protective circuit further connected to a terminal unit 6. The terminal unit 6 has a positive terminal 6a, a negative terminal 6b and a data transmission terminal 6c. The terminal unit 6 may be in the form of a plug. Depending on the target linked, the secondary battery 1 can decide to charge or discharge. The battery management chip 2 can send the status of the cells 3 to an external control system outside the secondary battery 1 through the data transmission terminal 6c. The battery management chip 2 can also receive instructions from the control system via the data transmission terminal 6c to manage the cells 3.

When the target which the terminal unit 6 is linked to is a charger, the current goes from the positive terminal 6a, to the cells 3, the discharging control switch 5 and the charging control switch 4, sequentially. Last, is passes the negative terminal 6b and returns back to the charger. Now, the charging control switch 4 and the discharging control switch 5 stay turned on. The battery management chip 2 knows the direction of the current by the resistor 7, further being aware of the status of charging. When the target which the terminal unit 6 is linked to is a load, the current flows from the cells 3, to the positive terminal 6a and the load. The load also has current flows to the negative terminal 6b, the charging control switch 4 and the discharging control switch 5, going back to the cells 3. The loop completes. At this moment, the charging control switch 4 and the discharging control switch 5 also in the status of turned on. The battery management chip 2 knows it is discharging depending on the direction of current through the resistor 7.

When the secondary battery 1 is charged, if an over-charged situation comes out (namely, the voltage of the secondary battery 1 is over its maximum rating voltage when in charging), the battery management chip 2 will turn off the charging control switch 4 to protect the secondary battery 1 from damage due to keeping charging. Similarly, when the secondary battery 1 discharges, if an over-discharged situation comes out (namely, the voltage of the secondary battery 1 is lower than a minimum allowable voltage value when discharging), the battery management chip 2 turns off the discharging control switch 5 to protect the secondary battery 1 from losing its rechargeability due to keeping discharging. When the over-charged protection is going on, since the voltage of the secondary battery 1 drops with time, as it is lower than the maximum rating voltage, the battery management chip 2 can work again to turn on the charging control switch 4, thus, the secondary battery 1 can also function well. However, when the over-discharged protection is going on, since the voltage of the secondary battery 1 is not able to come back to the normal operating voltage, unless a compulsory action takes place out of the battery for recovery, the secondary battery 1 can not function normally.

For end users, if the secondary battery is protected due to over-discharge and cannot come back to normal operations, they must think the secondary battery is damaged. The vendor of the secondary battery is asked for exchange. Even the vendor is willing to exchange a good secondary battery for with the original one, the cost for transportation is a lost to the vendor. Therefore, a design for relative circuit to effectively reboot the secondary battery for normal operations after the secondary battery is protected for being over discharged is desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to settle the problems mentioned above, a compulsory charging and protective circuit for secondary battery after being over discharged is provided. The circuit includes: a circuit conducting switch, connected in parallel with a charging control switch and a discharging control switch which are connected in series in a secondary battery at two ends, opening to electrically conduct the two ends; a releasing unit, for connecting to the grounding after a releasing voltage is received; a triggering unit, connected to the circuit conducting switch and the releasing unit, for electrically conducting a connection between the circuit conducting switch and the releasing unit after a triggering signal is received; and a comparing unit, electrically connected to the secondary battery, for comparing a value of a voltage difference between an anode and a cathode of the secondary battery with a minimum allowable voltage value; when the value of the voltage difference is greater than the minimum allowable voltage value, a normal voltage is provided to the releasing unit; when the value of the voltage difference is smaller than the minimum allowable voltage value, the releasing voltage is provided to the releasing unit. When the releasing unit is connected to the grounding and the triggering unit conducts electrical connection between the circuit conducting switch and the releasing unit, the circuit conducting switch turns on.

Preferably, the triggering unit is further connected to a triggering switch; when the triggering switch is turned on, the triggering signal is sent to the triggering unit.

Preferably, the triggering unit is a silicon controlled rectifier.

Preferably, a gate of the silicon controlled rectifier is connected to the triggering switch; when the triggering switch turns on, the gate receives a high level voltage.

Preferably, the compulsory charging and protective circuit further includes a power, connected to the circuit conducting switch, for providing power for operation of the circuit conducting switch.

Preferably, the comparing unit is a comparator.

Preferably, an input of the comparator is connected to a circuit signal source of the secondary battery.

Preferably, the circuit signal source is a discharging control switch pin or a working voltage pin (VDD) of the battery management chip of the secondary battery.

Preferably, the releasing unit comprises a field effect transistor and a parasitic diode.

Preferably, the circuit conducting switch is a MOS relay.

When the secondary battery is over discharged, a temporary electrical connection is provided by the present invention. The loop of the secondary battery and a charger keeps. When the secondary battery recovers from abnormal status, the temporary electrical connection is called off so that the secondary battery can keep normal operation. Thus, when the secondary battery is under over-discharge, it doesn't have to be unloaded for repair to settle the issue. Maintenance costs can be saved.

DETAILED DESCRIPTION OF THE PREFERRED EMBODIMENT

The present invention will now be described more specifically with reference to the following embodiment.

Figure 1:
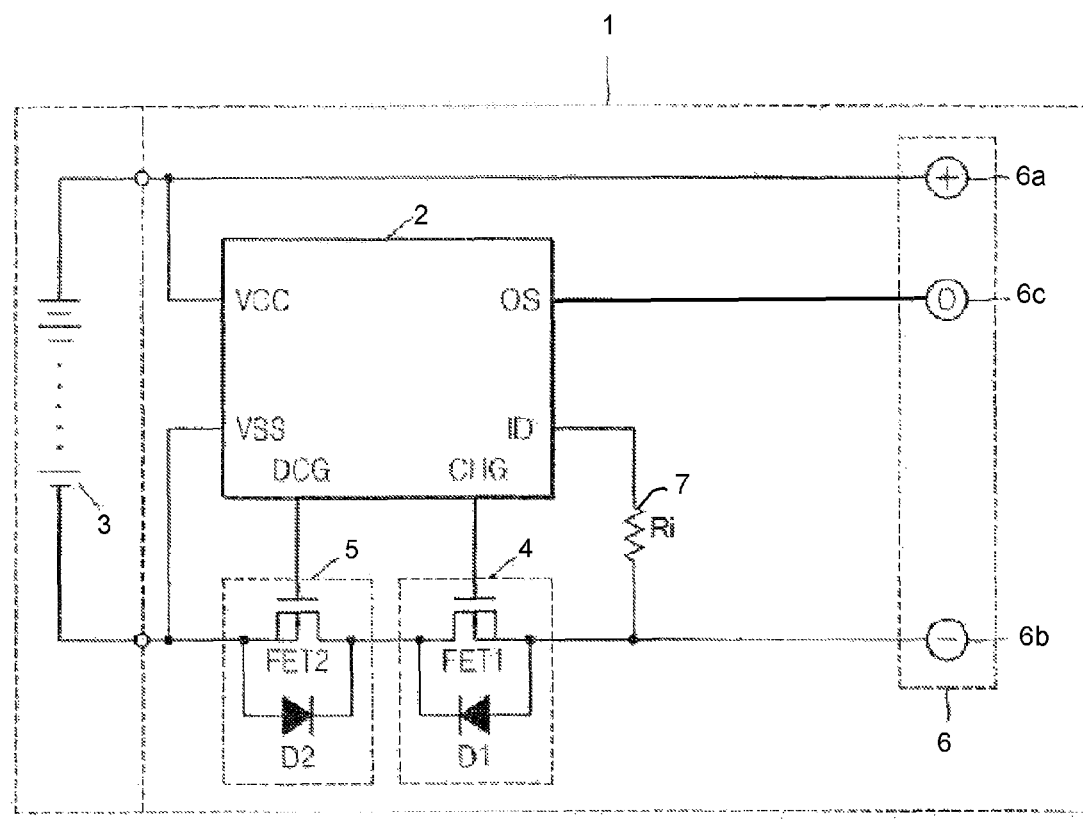
FIG. 1 illustrates a conventional structure of a secondary battery.
Figure 2:
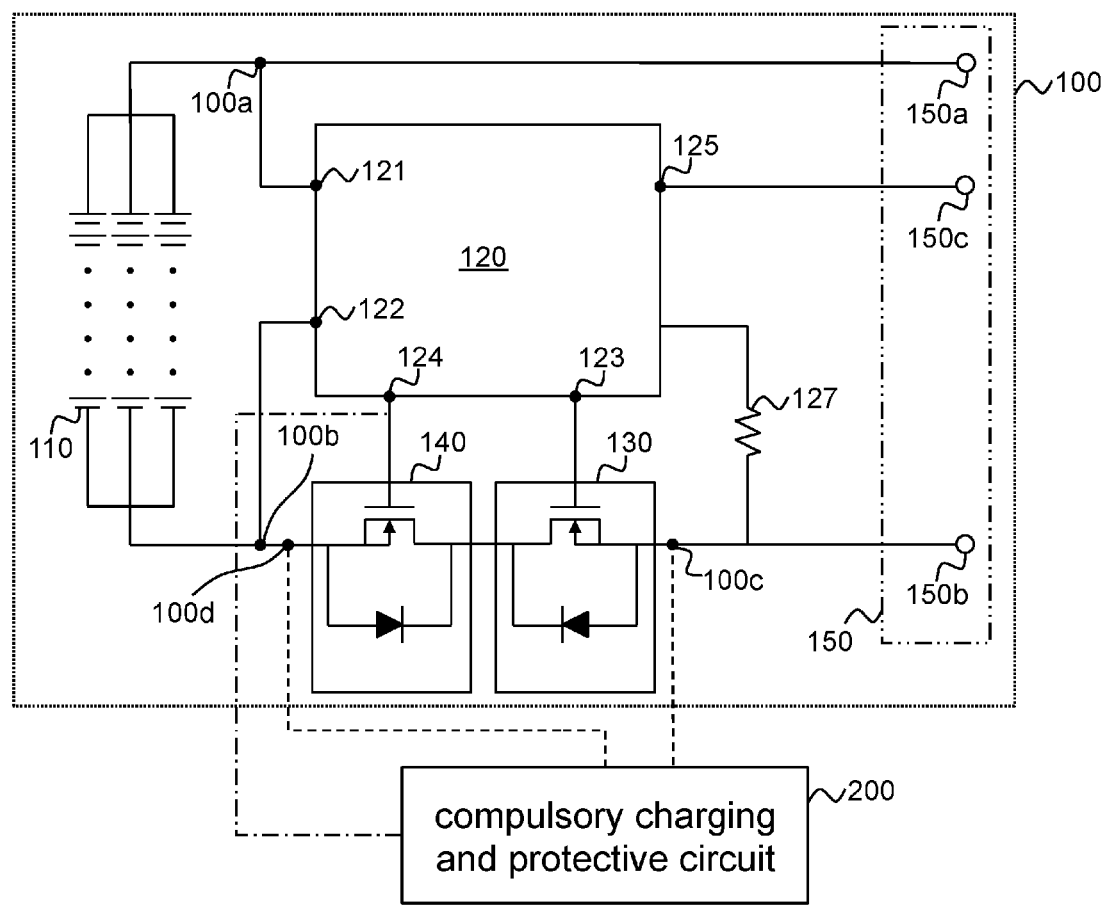
FIG. 2 shows a compulsory charging and protective circuit and a secondary battery linked thereby according to the present invention.
Figure 3:
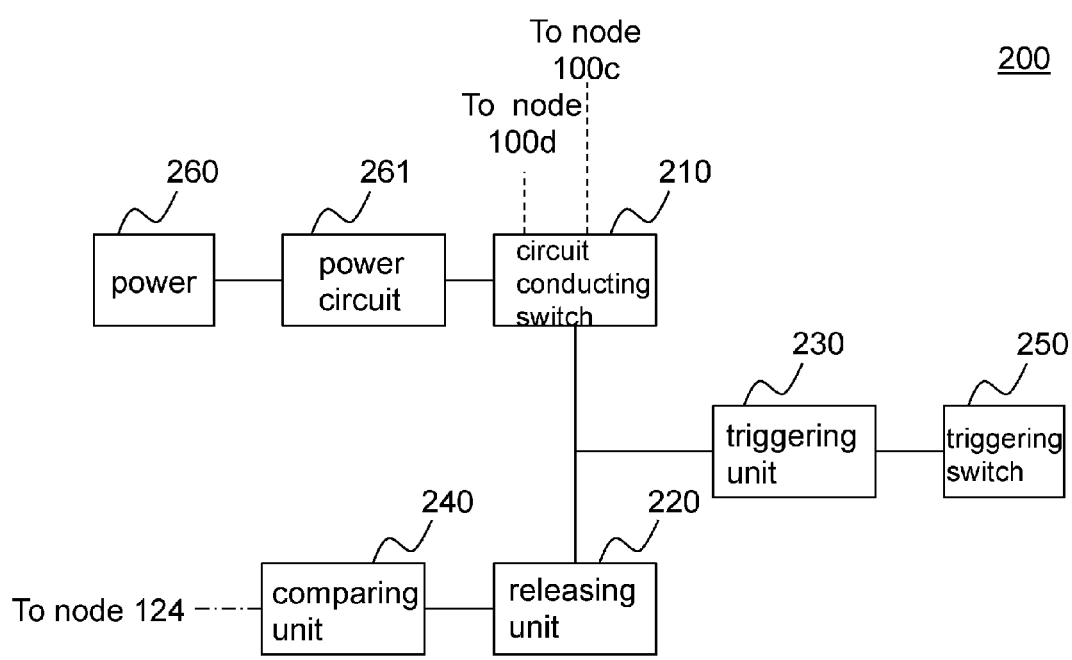
FIG. 3 is a structure of the compulsory charging and protective circuit.

Please see FIG. 2 to FIG. 6. An embodiment is illustrated. FIG. 2 shows a compulsory charging and protective circuit 200 according to the present invention. The compulsory charging and protective circuit 200 is linked to a secondary battery 100. Before the compulsory charging and protective circuit 200 is illustrated, the secondary battery 100 that the compulsory charging and protective circuit 200 is applied to should be explained first.

Secondary batteries in the market can be divided to many categories due to different components and application objects. For the secondary battery that used by the present invention, no matter what the materials and the specifications of the cells for storing power are (it should be a Ni—Cd battery, a Ni-MH battery, a Li-ion battery or a Li-polymer battery), there must be a battery management chip for managing the secondary battery. In addition, the battery management chip can protect the secondary battery from over-charge and over-discharge. Namely, when the secondary battery is in a status of over-charge or over-discharge, the battery management chip can stop operation of the secondary battery. Thus, in the description for FIG. 2, a structure of the secondary battery 100 mainly contains a number of cells 110 linked to one another in series and/or in parallel, a battery management chip 120 complied with the above requirements, a charging control switch 130, a discharging control switch 140 and a terminal unit 150.

When the secondary battery 100 is working, the charging control switch 130 and the discharging control switch 140 are both turned on so that current can pass through. When the target which the terminal unit 150 is connected to is a charger (not shown), the current goes through a positive terminal 150a, the group of the cells 110, the discharging control switch 140 and the charging control switch 130 sequentially. Finally, it returns to the charger through a negative terminal 150b. Now, all cells 110 are charged. When the target which the terminal unit 150 is connected to is a load (not shown), the current goes through the negative terminal 150b, the charging control switch 130, the discharging control switch 140 and the group of the cells 110. Finally, it returns to the load through the positive terminal 150a. Now, all cells 110 discharge. The battery management chip 120 is able to judge if the secondary battery 100 is in the status of charging or discharging by the direction the current goes through the resistor 127.

The battery management chip 120 has a number of pins. A working voltage pin (VDD) 121 is connected to a node 100a in the charging or discharging loop. Because the node 100a is close to a positive terminal of the group of the cells 110, it can obtain a high potential from the group of the cells 110. Relatively, a grounding pin (VSS) 122 is connected to a node 100b in the charging or discharging loop. Since the node 100b is close to a negative terminal of the group of the cells 110, it can obtain a low potential from the group of the cells 110. Differential value between the high potential and the low potential is roughly the working voltage value of the secondary battery 100 at that moment. The charging control switch pin 123 and the discharging control switch pin 124 are used to turn on or off the charging control switch 130 and the discharging control switch 140, respectively. When the secondary battery 100 is working properly, the charging control switch pin 123 and the discharging control switch pin 124 are both turned on. The battery signal pin 125 is used to transmit the status of the secondary battery 100 to a device (not shown) connected to a signal terminal 150c of the terminal unit 150, or operate the secondary battery 100 according to instructions from the device.

When the secondary battery 100 functions well, the compulsory charging and protective circuit 200 only links to the secondary battery 100 and doesn't take any action. Only when the secondary battery 200 encounters over-discharged situation, the compulsory charging and protective circuit 200 starts to function. The compulsory charging and protective circuit 200 includes a circuit conducting switch 210, a releasing unit 220, a triggering unit 230, a comparing unit 240, a triggering switch 250 and a power 260. The circuit conducting switch 210 is connected in parallel with the charging control switch 130 and the discharging control switch 140 which are connected in series in the secondary battery 100 at two ends, namely, electrically connection between to the nodes 100c and 100d in FIG. 2. When the circuit conducting switch 210 turns on, electrical connection between the nodes 100c and 100d (two ends) takes place immediately. The circuit conducting switch 210 may be an electronic switch of a general type. A MOS relay is recommended. The power 260 and the circuit conducting switch 210 are connected. The power 260 is used to provide necessary power for operating the circuit conducting switch 210. A power circuit 261 between the power 260 and the circuit conducting switch 210 to ensure the power is well transferred to the circuit conducting switch 210. Preferably, the power circuit 261 has a design to prevent countercurrent from the battery to protect the power 260.

Figure 4:
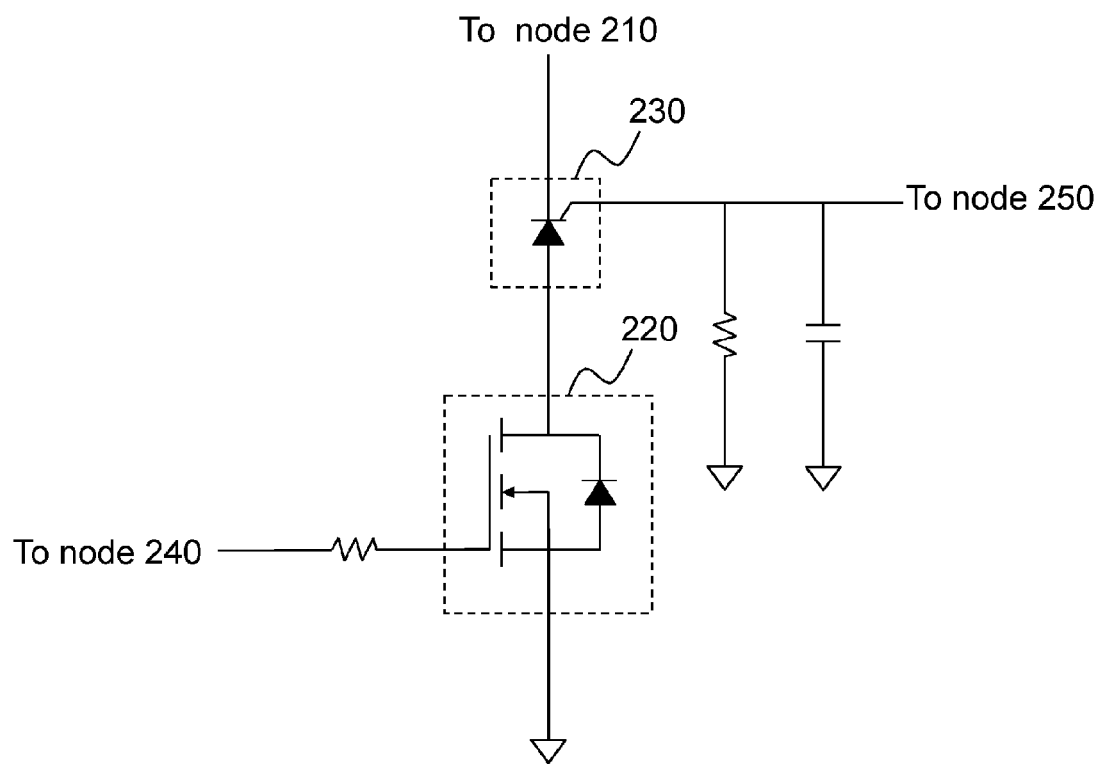
FIG. 4 illustrates a triggering unit and a releasing unit in the compulsory charging and protective circuit.
Figure 5:
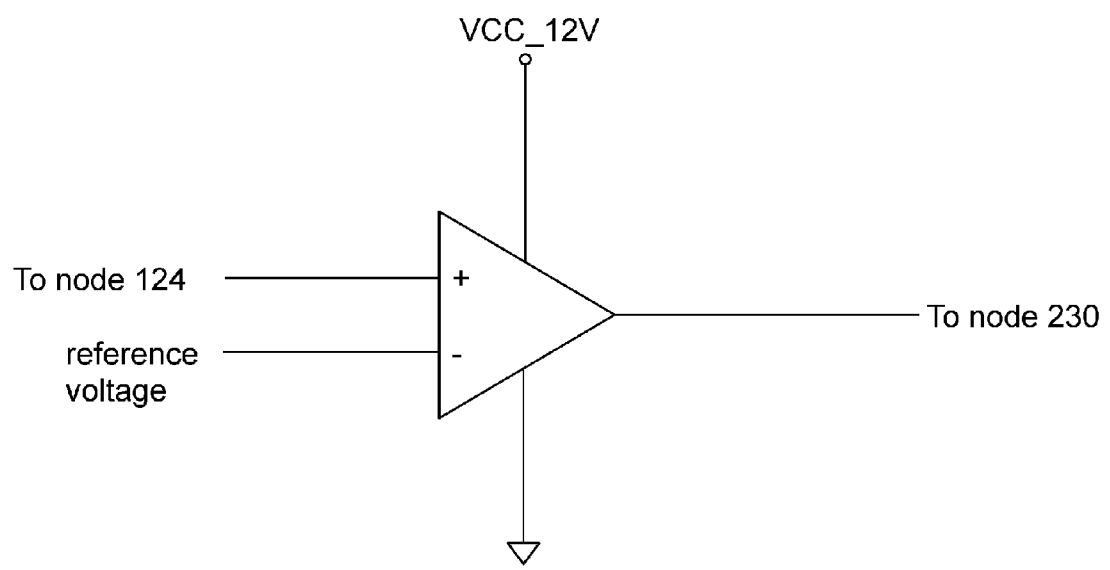
FIG. 5 illustrates a comparing unit in the compulsory charging and protective circuit.

The releasing unit 220 is used to connect to the grounding after receiving a releasing voltage. When a normal voltage is received, the releasing unit 220 stops grounding. In fact, the normal voltage may be any value other than the value fell in a tolerance of the releasing voltage. The releasing unit 220 is an electronic switch. As shown in FIG. 4, the releasing unit 220 is a switch composed of a field effect transistor and a parasitic diode. Its gate is electrically connected to the comparing unit 240. On-and-off of the releasing unit 220 is controlled by the comparing unit 240. The triggering unit 230 is connected to the circuit conducting switch 210 and the releasing unit 220, for electrically conducting the connection of the circuit conducting switch 210 and the releasing unit 220 after receiving a triggering signal. In the present embodiment, the triggering unit 230 is a silicon controlled rectifier. For a convenient control, the triggering unit 230 further connects to a triggering switch 250. The triggering switch 250 is turned off when the secondary battery 100 functions well. When the triggering switch 250 turns on, the mentioned triggering signal us sent to the triggering unit 230. This triggering switch 250 may be a button switch, controlled manually; the triggering switch 250 may also be an electronic switch, turned on by a specific issue, e.g. the secondary battery 100 stops working for 30 minutes due to over discharge. A gate of the silicon controlled rectifier is linked to the triggering switch 250. When the triggering switch 250 turns on, the gate receives a high level voltage, the triggering signal. When the releasing unit 220 is connected to the grounding and the triggering unit 230 conducts an electrical connection between the circuit conducting switch 210 and the releasing unit 220, the circuit conducting switch 210 turns on.

The comparing unit 240 is electrically connected to the secondary battery 100. It can compare voltage difference between an anode and a cathode of the secondary battery 100, namely the working voltage of the secondary battery 100, with a minimum allowable voltage value. When the voltage difference is greater than the minimum allowable voltage value, a normal voltage is provided to the releasing unit 220; when the voltage difference is smaller than the minimum allowable voltage value, a releasing voltage is provided to the releasing unit 220. In practice, the comparing unit 240 may be a comparator. Please refer to FIG. 5. The comparator not only connects to the working voltage (please notice that the working voltage of the secondary battery 100 may not the same as that of the compulsory charging and protective circuit 200) and grounding, but also two inputs and one output. The minimum allowable voltage value is used to evaluate if the secondary battery 100 is over-discharged. If the voltage difference between the abode and the cathode of the secondary battery 100 is lower than the minimum allowable voltage value, the secondary battery 100 is considered in a status of over discharge. The minimum allowable voltage is a reference voltage and imputed from an input (−). The other input (+) of the comparator is connected to a circuit signal source of the secondary battery 100, fetching a working voltage of the secondary battery 100 or the voltage difference between the anode and the cathode immediately. The circuit signal source may be the discharging control switch pin 124 of the battery management chip 120 of the secondary battery 100. It can also be the working voltage pin 121. It depends on the design of the battery management chip 120 where the pin can provide the mentioned working voltage or voltage difference when the secondary battery 100 stops functioning. It should be noticed in the present embodiment that due to selection of the inputs, the normal voltage has a voltage level higher than that of the releasing voltage. If the inputs of the reference voltage and the working voltage are exchanged, the normal voltage will have a voltage level higher than that of the releasing voltage.

Figure 6:
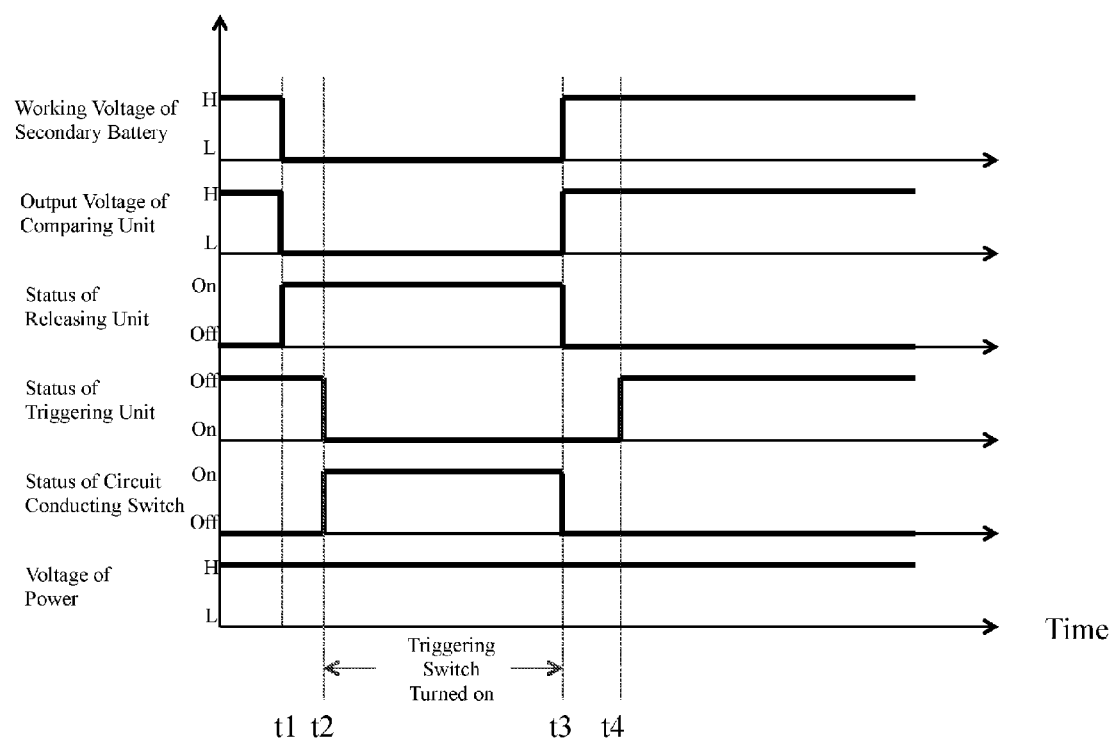
FIG. 6 is a time table for some elements in the compulsory charging and protective circuit.

Please refer to FIG. 6. Description of operations of the compulsory charging and protective circuit 200 are illustrated below. In FIG. 6, the statuses off working voltage of the secondary battery 100, H (High) and L (Low), represent the secondary battery 100 is under normal working and over discharge, respectively. H and L of the output voltage of the comparing unit 240 represent the normal voltage and the releasing voltage outputted from the comparing unit 240, respectively. H and L of the voltage of the power 260 represent the statuses of power provided and power not provided by the power 260, respectively.

When the compulsory charging and protective circuit 200 and the secondary battery 100 are connected under normal working status, the outputted voltage from the comparing unit 240 is the normal voltage. The releasing unit 220 turns off. The triggering switch 250 turns off. The circuit conducting switch 210 turns off. It should be noticed that the power 260 is all turned on to provide power when the compulsory charging and protective circuit 200 and the secondary battery 100 are connected. Thus, the compulsory charging and protective circuit 200 can function well.

When time comes to t1, the secondary battery 100 is in the status of over discharge and the discharging control switch 140 turns off. When the secondary battery 100 discharges, the loop is opened at the discharging control switch 140. The line linked by the compulsory charging and protective circuit 200 between the node 100c and the node 100d forms a bypass connection. Now, a value of the voltage difference provided by the circuit signal source is lower than the minimum allowable voltage value. The comparing unit 240 changes the outputted voltage to be a low level voltage, the releasing voltage, to the releasing unit 220. The releasing unit 220 is connected to the grounding. However, since the triggering switch 250 is turned off so that the triggering unit 230 has not received the triggering signal, the circuit conducting switch 210 doesn't connect to the releasing unit 220. The circuit conducting switch 210 is off. When time comes to t2, the triggering switch 250 turns on. The circuit conducting switch 210 and the releasing unit 220 are electrically connected. At this moment, the circuit conducting switch 210 turns on, a short circuit forms between the node 100c and the node 100d, the charger can compulsorily charge the secondary battery 100 via the terminal unit 150.

When the voltage difference between the anode and the cathode of the secondary battery 100 has increased by charging after a period of time, the bypass connection should be called off. Operations of the secondary battery 100 return back to the battery management chip 120. At t3, a value of voltage difference provided by the circuit signal source is greater than the minimum allowable voltage value. The comparing unit 240 provides the normal voltage to the releasing unit 220. The releasing unit 220 is not connected to the grounding. As a result, the circuit conducting switch 210 turns off. The electrical connection between the node 100c and the node 100d cannot be held by the bypass connection. If the secondary battery 100 keeps charged by the charger, the battery management chip 120 will turn on the discharging control switch 140 since the secondary battery 100 has a normal working voltage, so that the voltage difference between the anode and the cathode of the secondary battery 100 keeps going up. The triggering switch 250 is not necessary to be turned off at t3. It can be turned off later (t4). Because the releasing unit 220 is not connected to the grounding, status of the triggering switch 250 during t3 and t4 doesn't affect the status of the circuit conducting switch 210 to be off.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A compulsory charging and protective circuit for secondary battery after being over discharged, comprising:
    a circuit conducting switch, connected in parallel with a charging control switch and a discharging control switch which are connected in series in a secondary battery at two ends, opening to electrically conduct the two ends;
    a releasing unit, for connecting to a ground after a releasing voltage is received;
    a triggering unit, connected to the circuit conducting switch and the releasing unit, for electrically conducting a connection between the circuit conducting switch and the releasing unit after a triggering signal is received; and
    a comparing unit, electrically connected to the secondary battery, for comparing a value of a voltage difference between an anode and a cathode of the secondary battery with a minimum allowable voltage value; when the value of the voltage difference is greater than the minimum allowable voltage value, a normal voltage is provided to the releasing unit; when the value of the voltage difference is smaller than the minimum allowable voltage value, the releasing voltage is provided to the releasing unit;
    wherein when the releasing unit is connected to the ground and the triggering unit conducts electrical connection between the circuit conducting switch and the releasing unit, the circuit conducting switch turns on.

2. The compulsory charging and protective circuit according to claim 1, wherein the triggering unit is further connected to a triggering switch; when the triggering switch turns on, the triggering signal is sent to the triggering unit.

3. The compulsory charging and protective circuit according to claim 2, wherein the triggering unit is a silicon controlled rectifier.

4. The compulsory charging and protective circuit according to claim 3, wherein a gate of the silicon controlled rectifier is connected to the triggering switch; when the triggering switch turns on, the gate receives a high level voltage.

5. The compulsory charging and protective circuit according to claim 1, further comprising a power, connected to the circuit conducting switch, for providing power for operation of the circuit conducting switch.

6. The compulsory charging and protective circuit according to claim 1, wherein the comparing unit is a comparator.

7. The compulsory charging and protective circuit according to claim 6, wherein an input of the comparator is connected to a circuit signal source of the secondary battery.

8. The compulsory charging and protective circuit according to claim 7, wherein the circuit signal source is a discharging control switch pin or a working voltage pin (VDD) of the battery management chip of the secondary battery.

9. The compulsory charging and protective circuit according to claim 1, wherein the releasing unit comprises a field effect transistor and a parasitic diode.

10. The compulsory charging and protective circuit according to claim 1, wherein the circuit conducting switch is a MOS relay.

* * * * *